United States Patent [19]

Gazzara et al.

[11] 4,324,127
[45] Apr. 13, 1982

[54] SPIROMETER CALIBRATION DEVICE AND ASSOCIATED DISPLACEMENT DETECTION SYSTEM

[75] Inventors: Peter Gazzara, Reading; John W. Burke, Jr., Melrose; Rodney Edwards, Jr., Framingham, all of Mass.

[73] Assignee: Biotrine Corporation, Woburn, Mass.

[21] Appl. No.: 95,484

[22] Filed: Nov. 19, 1979

[51] Int. Cl.³ .............................................. G01F 25/00
[52] U.S. Cl. ................................................................ 73/3
[58] Field of Search ............. 73/3, DIG. 3; 338/32 H

[56] References Cited

U.S. PATENT DOCUMENTS

| | | | |
|---|---|---|---|
| 1,234,505 | 7/1917 | Stillman | 73/3 |
| 3,199,630 | 8/1965 | Engle et al. | 338/32 H |
| 3,403,544 | 10/1968 | Francisco | 73/3 |
| 3,877,287 | 4/1975 | Duntz | 73/3 |
| 4,112,408 | 9/1978 | Roozenbeck | 338/32 H |
| 4,152,922 | 5/1979 | Francisco | 73/3 |

*Primary Examiner*—S. Clement Swisher
*Attorney, Agent, or Firm*—Bruce D. Sunstein

[57] ABSTRACT

A device for calibrating a Spirometer includes a hand driven syringe having magnetic elements displaced along the shaft of the syringe piston at intervals corresponding to designated volumes. A Hall effect transducer senses the passage of the magnetic when the syringe piston is actuated and transmitts pulses to a timer so that average rate of flow delivered by the syringe can be derived.

5 Claims, 7 Drawing Figures

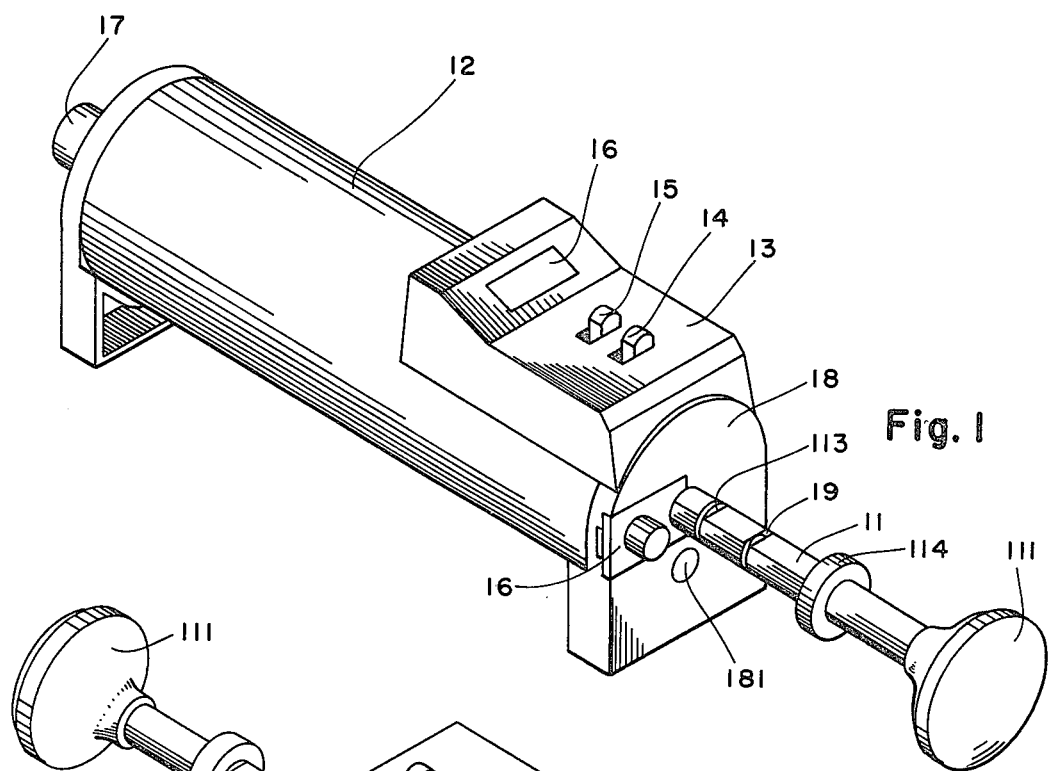
Fig. 1
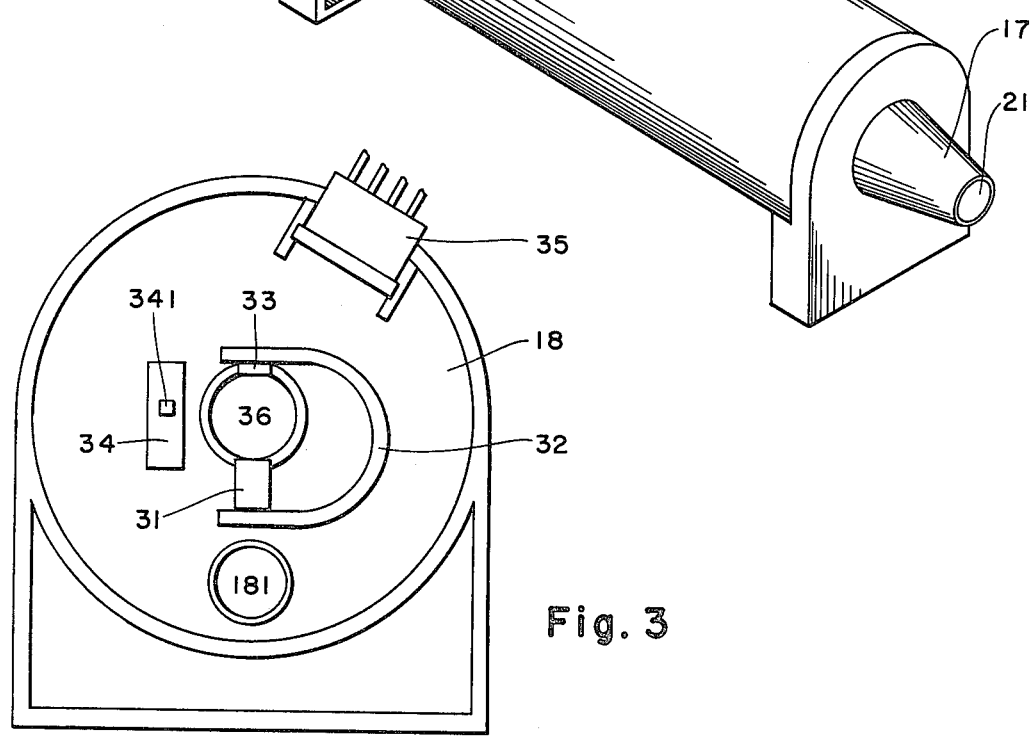
Fig. 2
Fig. 3

SPIROMETER CALIBRATION DEVICE AND ASSOCIATED DISPLACEMENT DETECTION SYSTEM

DESCRIPTION

Technical Field

This invention relates to spirometer calibration devices and systems for detecting displacement that may be used in connection with such calibration devices and in other applications.

Background Art

Since the early 1970's, when electronic spirometers which measure lung volumes by integrating the expiratory flow become increasingly popular, there has been a need for a reliable means to check calibration. Generally, a large syringe has been used, typically of 1 to 3 liters of volume, and hand driven at a rate, usually variable, determined by the operator. Electrically or pneumatically driven calibrators, which can repetitively generate pre-determined volume-time characteristics, have also been used, but in smaller numbers because of the increased cost. These syringes are typically in the 5 liter volume range, and used by manufacturers or researchers.

Small hand-driven syringes have typically been of clear plastic, with the piston positioned by eye to calibration marks outside of the barrel of the syringe. The seal to the piston has typically been a greased O-ring.

Volumes obtained from various types of bellows (including the rolling-seal type), and by back-filling a water seal spirometer, are subject to change, owing to container expansion, with the delivery pressure of the volume. Although often used, these methods have not gained general acceptance as an independent calibration check.

An improved hand-driven syringe design has been developed by some of us. The syringe barrel is of lightweight glass fiber, which is formed on a polished mandrel (4" diameter) to provide a smooth inside surface with excellent dimensional tolerance and "roundness." The seal to the piston is cup-shaped, and actually improves as a seal under pressure. There is sufficient compliance in the sides of the seal that side-loading of the piston drive shaft does not result in significant leakage.

The syringe barrel is not transparent, and the shaft is used to determine the volume setting. A stroke of approximately 15" gives a 3-liter volume, and 0.1 liter increments are marked. Additionally, positive locks are provided at 0.5 liter increments, so that these settings may be accurately determined. If there are no leaks (which can easily be checked) the accuracy of the indicated volumes is a direct function of the diameter and uniformity of the glass fiber barrel (inside diameter) and the shaft marking.

Generally, hand-driven syringes do not permit calibration of spirometers with respect to the actual flow produced by the syringe. Flow, of course, is a measure of volume of fluid (in this case air) per unit time. Because hand-driven syringes are not generally adapted to permit accurate measurement of time during which a known volume is being displaced, no direct flow reading can be obtained.

Electrically or pneumatically driven calibrators, which do not have the limitations of hand-driven syringes, nevertheless require complex control circuits in order to assure reproducability of their volume-time characteristics, and are therefore costly and in some instances susceptible to substantial inaccuracies.

Disclosure of the Invention

Accordingly, it is an object of the present invention to provide a low-cost device for calibration of spirometers.

It is also an object of the present invention to provide a device that accurately displays the average flow of a known volume of air.

It is also an object of the present invention to provide a device for timing accurately the interval over which is displaced a known volume of air;

It is a further object of the present invention to provide a system for detecting the displacement of an article with respect to a structure, such system having particular application to spirometer calibration devices.

In a preferred embodiment of the invention, these and other objects of the invention are achieved by providing a first means for displacing a volume; a second means for sensing the acts of commencement and termination of the displacement by the first means of a known volume; and a third means for measuring the lapsed time between such commencement and termination. In another embodiment, the invention comprises a system for detecting the displacement of an article with respect to a structure, and the system includes a magnetic sensor, mounted in fixed relation to one of either the article or the structure, and a starting tripper that is capable of exciting the magnetic sensor and is mounted in fixed relation to the other of the article or the structure.

BRIEF DESCRIPTION OF THE DRAWINGS

These and other objects and features of the invention will be more readily understood by consideration of the following detailed description taken with the accompanying drawings, in which:

FIG. 1 is a perspective view of a preferred embodiment of the invention;

FIG. 2 is another perspective view of the embodiment shown in FIG. 1;

FIG. 3 is a view of the inside of the end plate 18 shown in FIG. 1;

DESCRIPTION OF SPECIFIC EMBODIMENTS

Figure 4:
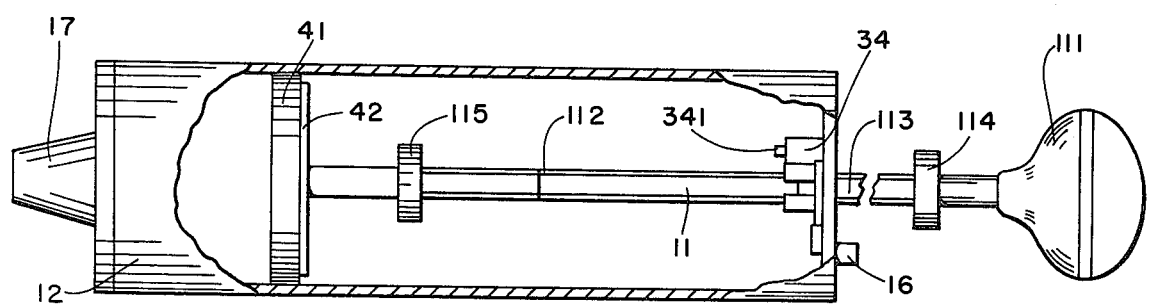
FIG. 4 is a cutaway view of the embodiment shown in FIGS. 1 and 2.

Referring now to FIG. 1, there is shown a perspective view of a preferred embodiment of the invention. In this embodiment, there is provided a calibration shaft 11 that is moved, by grasping handle 111, in and out of a barrel 12. As will be shown with particular reference to FIG. 4, the calibration shaft is affixed to a piston assembly that forces air from the barrel 12 through a nozzle 17. In order to avoid undue pressures behind the piston during operation of the device there is provided a pressure relief port 181 in the end plate 18. The device illustrated has a capacity to displace 3.0 liters of air through the nozzle 17 if the calibration shaft 11 is pulled to its normal maximum limit out from the barrel 12 and then pushed into the barrel to the maximum. The maximum inward limitation is created by calibration annulus 114. The calibration shaft 11 is made of a non-ferrous material, such as aluminum. At intervals corresponding to displacement of 0.5 liters by the piston, the shaft has calibration notches such as notch 19 shown in FIG. 1. These notches can be engaged by the locking mechanism 16 when the shaft is properly positioned, so that specific displacements less than 3 liters can be made with precision. If, for example, the user wishes to displace precisely 0.5 liters of air, the handle 111 would be pushed in until locking mechanism 16 could be engaged against notch 19; with the shaft so positioned, the locking mechanism is then released and the 0.5 liter displacement can be achieved by pushing the handle 111 in until the limit of excursion of the calibration shaft is reached. This limit occurs when the calibration annulus 114 engages against the end plate 18. At points along the calibration shaft corresponding to displacement of 0.75 and 2.25 liters, are located steel washers to serve as ferromagnetic tripping rings; in FIG. 1, there is shown tripping washer 113 at the 0.75 liter position.

Still in reference to FIG. 1, there is shown the circuit housing 13. The housing contains a numeric display 16, an off/on switch 15, and a function switch 14. The function switch determines whether or not the display 16 indicates $FEF_{25-75\%}$ or $FEV_t = 0.75$ L. $FEV_t = 0.75$ L is the time elapsed in displacing the first 0.75 liters of the stroke. $FEF_{25-75\%}$ is the mean forced expiratory flow during the middle half of a forced exhalation. Since the device is designed to displace a 3 liter total volume, the 25% and 75% volume points are reached at 0.75 and 2.25 liters respectively. Accordingly, as will be shown in more detail below, when the function switch 14 is in the $FEF_{25-75\%}$ position, the tripping washers, including tripping washer 113 at the 0.75 liter position and the other tripping washer at the 2.25 liter position, respectively commence and terminate a timing circuit within the circuit housing 13. Circuitry within the housing then operates to cause display of $FEF_{25-75\%}$ in the display 16.

Finally, in reference to FIG. 1, when the function switch 14 is in the $FEV_t = 0.75$ L position, the same timing circuit used in connection with determining $FEF_{25-75\%}$ within the circuit housing 13 is respectively connected and terminated by a switch (discussed as item 34 in FIG. 3) and by the tripping washer (discussed as item 112 in FIG. 4) at the 2.25 liter position. In this position, the timing circuit measures the time elapsed in displacing the first 0.75 liters of the stroke, and the result appears in display 16.

Referring now to FIG. 2, there is shown another view of the device shown in FIG. 1. It can be seen that the nozzle 17 is a tapered cone having an aperture 21. The nozzle permits ready connection to most spirometers.

FIG. 3 illustrates the shaft displacement detection system, and is a view of the inside portion of the assembly on end plate 18. The basic detection system is magnetic. A short bar magnet 31 is located on one side of the shaft entrance through the end plate 18. The bar magnet is in mechanical contact with a U-shaped ferromagnetic steel strip 32 that is positioned to reach around to the side of the entrance aperture 36 opposite that of the bar magnet 31. Sandwiched between the side of the entrance aperture 36 that is opposite to the bar magnet 31 and the ferromagnetic strip 32 is a Hall-effect device 33. As a result of this configuration, a complete magnetic path is provided from magnet 31 around the strip 32 through the Hall device 33—except that there is a gap in the path at entrance aperture 36. When that gap is closed by one of the two tripping washers, such as tripping washer 113 discussed in connection with FIG. 1, the Hall device provides an electrical output that is utilized by the circuitry in housing 13 illustrated in FIG. 1. The device is re-set whenever the button 341 on switch 34 is depressed. Electrical connections to the Hall device 33 and the switch 34 are made through connector 35 to the circuitry in housing 13 illustrated in FIG. 1. Also shown in FIG. 3 is pressure relief port 181, which was discussed in connection with FIG. 1.

In FIG. 4 is shown a side cutaway view of the device of FIG. 1. It can be seen that the button 341 of the switch 34 is depressed by the calibration annulus 115 when it limits the maximum outward extension of the calibration shaft 11. The calibration shaft is connected to the piston assembly, including mandrel 42 and piston cup seal 41. The cup seal forms a good seal to the inside walls of barrel 12, permitting reproducable displacements of measured volumes of air through nozzle 17. In this figure are also shown the tripping washers 113 and 112 at the 0.75 and 2.25 liter points respectively on the calibration shaft 11. Throughout the description herein, a numerical designation given to an item in connection with the description for one figure is retained for subsequent figures, and, accordingly, other items having the numerical designations in FIG. 4 that are not described at this point have been previously described in connection with FIGS. 1 through 3.

Figure 5:
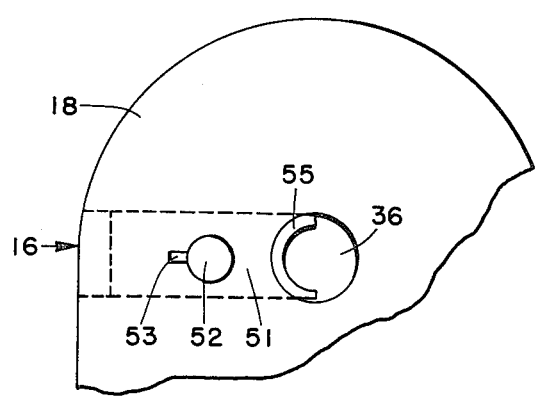
FIG. 5 is a detailed view of a portion of the outside of the end plate 18 shown in FIG. 1 for the purpose of illustrating the calibration lock mechanism.

Referring now to FIG. 5, there is shown a partial view of the outside of end plate 18 in order to illustrate the locking mechanism 16. The mechanism consists of a special slidable plate 51 mounted within the end plate 18. The slidable plate has a curved edge 55 that is capable of engaging in notches of the calibration shaft when the plate has been moved toward the shaft by knob 52 that is connected to the plate through slot 53.

Figure 6:
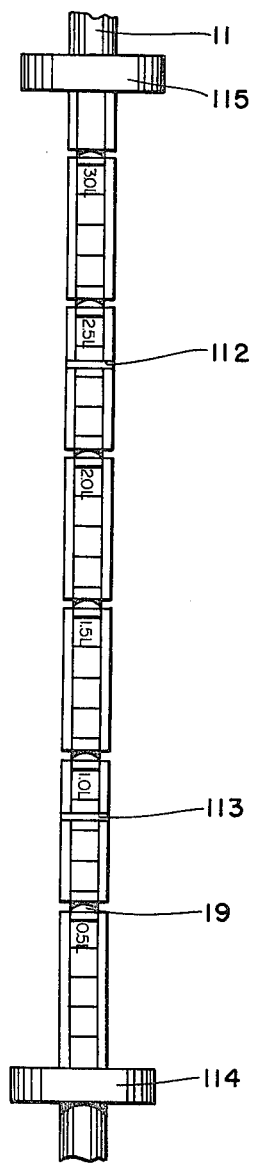
FIG. 6 is a view of the shaft 11 shown in FIG. 1.

Illustrated in FIG. 6 is a segment of the calibration shaft, including calibration annuli 114 and 115, tripping washers 113 and 112, and notches of the type indicated by item 19.

Figure 7:
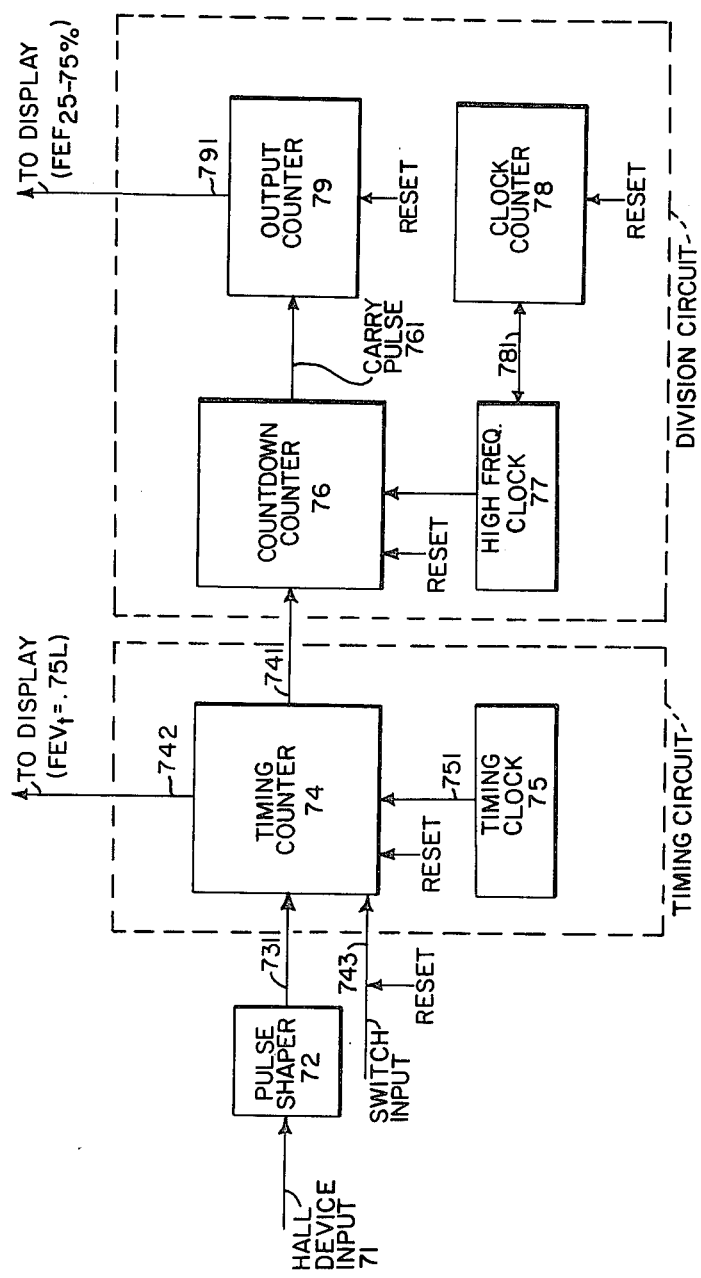
FIG. 7 is a block diagram of the circuitry of the embodiment shown in FIGS. 1 and 2.

Operation of the electronic circuitry of the device of FIG. 1 is illustrated in the simplified block diagram of FIG. 7. Input 71 from the Hall device is to a pulse shaper 72, which toggles and provides a clean pulse when a tripping washer 113 or 112 goes in the magnetic path discussed in regard to FIG. 3. A timing counter 74 receives an input 721 from the pulse shaper 72 which controls the counting of clock pulses received through input 751 from the timing clock 75. When the function is set to $FEV_t = 0.75$ L, counter 74 is started by switch input 743 and stopped by pulse shaper input 721. The resulting count in timing counter 74 drives a display of $FEV_t = 0.75$ L over line 742.

Still in response to FIG. 7, when the function is set to $FEF_{25-75\%}$, the counter is started and stopped by the input 721 from the pulse shaper 72. Information from the counter is then used to compute a flow rate by division in the following manner. A countdown counter 76 receives an input from the timing counter after timing has been completed. Each time the countdown counter 76 reaches zero it emits a carry pulse over output 761. When the countdown counter reaches zero, it is again reset to the initial and recommences the countdown. The counter 76 is driven by high frequency clock 77, which sends into the countdown counter 76 a fixed number of pulses, dependent on the one and one-half liter total volume of air displaced in accordance with the excursion of the calibration shaft between tripping washers 113 and 112. The limit on the total number of pulses from the high frequency clock 77 is determined by clock counter 78 that monitors the high frequency clock 77 over line 781. When the high frequency clock has stopped, the total number of carry pulses transmitted over line 761 are accumulated in the output counter 79, the output of which is displayed over line 791 in a display. Regardless of which function is selected, all counters are reset by the switch that is also connected to input 743. The switch discussed herein is the same as switch 34 of FIG. 3. Thus the circuitry is reset whenever the calibration shaft 11 is pulled out all the way so that the calibration annulus 115 contacts and depresses button 341 of switch 34.

It will be evident that sensing with two tripping washers is a matter of choice. There could, for example, be utilized a single tripping washer and two sensing assemblies, although such an arrangement may well be more complex. Sensing need not be accomplished magnetically. It may, for example, be capacitive, mechanical, or photo electric, although each of these approaches may be somewhat less desirable than magnetic sensing in applications of the type discussed herein. Mechanical sensing, however, has the advantage of simplicity and economy over many alternatives. Magnetic sensing avoids any additional friction, and offers relative immunity from problems caused by dust and dirt, as well as long life.

Accordingly, while the invention has been described with particular reference to specific embodiments thereof in the interest of complete definiteness, it will be understood that it may be embodied in a variety of forms diverse from those shown and described without departing from the spirit and scope of the invention as defined by the following claims.

What is claimed is:

1. A calibration device comprising:
    first means, for displacing a given volume, such first means including (i) a structure and (i) a member movably mounted so as to permit displacement thereof with respect to the structure, displacement of the member with respect to the structure causing displacement of a volume;
    second means, for sensing, in the course of displacement by the first means of the given volume, the acts of commencement and termination of the displacement by the first means of a known volume, the known volume being equal to or less than the given volume, such second means including (i) a starting tripper, mounted in fixed relation to one of either the member or the structure, (ii) a stopping tripper mounted in fixed relation to the starting tripper, and (iii) a sensor, responsive to the physical proximity of the starting tripper and to that of the stopping tripper, and mounted in fixed relation to the other of the member or the structure, and thereby in movable relation to the trippers, so that displacement of the member with respect to the structure causes the trippers to excite the sensor at both the commencement and the termination of displacement by the piston of the known volume, and wherein (a) the sensor includes a Hall-effect device, for responding to proximate magnetic field changes, and (b) the starting and stopping trippers each include fifth means, for causing magnetic field changes in the vicinity of the sensor when the fifth means is proximate thereto; and
    third means, for measuring the elapsed time between such commencement and termination.

2. A calibration device comprising:
    first means, for displacing a given volume, such first means including (i) a structure and (i) a member movably mounted so as to permit displacement thereof with respect to the structure, displacement of the member with respect to the structure causing displacement of a volume;
    second means, for sensing, in the course of displacement by the first means of the given volume, the acts of commencement and termination of the displacement by the first means of a known volume, the known volume being equal to or less than the given volume, such second means including (i) a starting tripper, mounted in fixed relation to one of either the member or the structure, (ii) a stopping tripper mounted in fixed relation to the starting tripper, and (iii) a sensor, responsive to the physical proximity of the starting tripper and to that of the stopping tripper, and mounted in fixed relation to the other of the member or the structure, and thereby in movable relation to the trippers, so that displacement of the member with respect to the structure causes the trippers to excite the sensor at both the commencement and the termination of displacement by the piston of the known volume, and wherein (a) the sensor includes a fourth means, for responding to proximate magnetic field changes, and a magnet connected magnetically in series with the fourth means in such a way as to form a complete magnetic path except for a gap and (b) the starting and stopping trippers each include fifth mans, for causing magnetic field changes in the vicinity of the sensor when the fifth means is proximate thereto; and
    third means, for measuring the elapsed time between such commencement and termination.

3. A device according to claim 1, in which:
(a) the first means further includes a calibration shaft, of non-magnetic material, linked to the member; and
(b) each of the starting and stopping trippers includes a ferromagnetic ring mounted coaxially on the calibration shaft.

4. A device according to claim 2, in which:
(a) the first means further includes a calibration shaft, of non-magnetic material, linked to the member; and
(b) each of the starting and stopping trippers includes a ferromagnetic ring mounted coaxially on the calibration shaft.

5. A calibration device comprising:
    first means, for displacing a given volume, such first means including (i) a structure and (i) a member movably mounted so as to permit displacement thereof with respect to the structure, displacement of the member with respect to the structure causing displacement of a volume;
    second means, for sensing, in the course of displacement by the first means of the given volume, the acts of commencement and termination of the displacement by the first means of a known volume, the know volume being equal to or less than the given volume, such second means including (i) a starting sensor, mounted in fixed relation to one of either the member or the structure, (ii) a stopping sensor mounted in fixed relation to the starting sensor, and (iii) a tripper, to excite each sensor when in physical proximity thereto, and mounted in fixed relation to the other of the member or the structure, and thereby in movable relation to the sensors, so that displacement of the member with respect to the structure causes the starting sensor to be excited at the commencement of displacement by the piston of the known volume and the stopping sensor to be excited at the termination of such displacement, and wherein (a) each sensor includes a fourth means, for responding to proximate magnetic field changes, and a magnet connected magnetically in series with the fourth means in such a way as to form a complete magnetic circuit except for a gap and (b) the tripper (i) is of a ferromagnetic material and (ii) is located so as to close the gap of any sensor when the tripper is in a predetermined location proximate thereto; and third means, for measuring the elapsed time between such commencement and termination.

* * * * *